US008137732B2

(12) United States Patent
Groll (10) Patent No.: US 8,137,732 B2
(45) Date of Patent: Mar. 20, 2012

(54) FLAVOR INFUSION DEVICE FOR ROASTING POULTRY

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 206 days.

(21) Appl. No.: 12/729,342

(22) Filed: Mar. 23, 2010

(65) Prior Publication Data

US 2011/0070345 A1   Mar. 24, 2011

Related U.S. Application Data

(60) Provisional application No. 61/244,469, filed on Sep. 22, 2009.

(51) Int. Cl.
*A47J 37/04* (2006.01)
(52) U.S. Cl. ........ 426/644; 426/466; 426/506; 426/523; 99/345; 99/419; 99/446; 99/421 H
(58) Field of Classification Search .................. 426/644, 426/466, 506, 523; 99/419, 444, 446, 345, 99/421 H–421 HV
See application file for complete search history.

(56) References Cited

U.S. PATENT DOCUMENTS

| | | | | |
|---|---|---|---|---|
| 1,741,400 A | * | 12/1929 | Bocchino | 99/421 H |
| 1,887,219 A | * | 11/1932 | Stranszky | 99/419 |
| 2,085,169 A | * | 6/1937 | Prood | 99/421 H |
| 2,111,456 A | * | 3/1938 | Markle, Jr. | 269/54.5 |
| 3,311,048 A | * | 3/1967 | Pickering | 99/346 |
| 3,713,378 A | * | 1/1973 | West et al. | 99/346 |
| 3,922,960 A | * | 12/1975 | Lewis | 99/346 |
| 4,127,060 A | * | 11/1978 | Curtis | 99/419 |
| 5,301,602 A | * | 4/1994 | Ryczek | 99/345 |
| 6,062,131 A | * | 5/2000 | Holland | 99/345 |
| 6,119,585 A | * | 9/2000 | Guidry | 99/345 |
| 6,125,739 A | * | 10/2000 | Jernigan | 99/345 |
| 6,588,324 B1 | * | 7/2003 | Mor et al. | 99/346 |
| 7,000,529 B2 | * | 2/2006 | Sculuca | 99/421 A |
| D554,429 S | * | 11/2007 | Measom | D7/409 |
| 7,879,381 B2 | * | 2/2011 | Dow et al. | 426/523 |
| D633,335 S | * | 3/2011 | Groll | D7/402 |
| 2006/0112835 A1 | * | 6/2006 | Healy | 99/345 |
| 2007/0181006 A1 | * | 8/2007 | Measom | 99/345 |
| 2011/0209627 A1 | * | 9/2011 | Wong | 99/419 |

* cited by examiner

*Primary Examiner* — Drew E Becker
(74) *Attorney, Agent, or Firm* — The Webb Law Firm (57) ABSTRACT

A flavor infusion device for roasting poultry, such as chicken, comprising an elongated metal member having an attachment means at one end for attachment to a sidewall of a roasting pan, a radiused bent portion extending upwardly from the attachment means, and a horizontal arm portion extending from the radiused bent portion in a substantially horizontal orientation relative to the roasting pan to support an open cavity of the poultry, said horizontal arm portion having a flavor cup associated therewith for receiving an infusion flavoring liquid therein. A method of roasting poultry comprising the steps of providing a flavor infusion device, attaching the device to a sidewall of a roasting pan, placing an infusion liquid in the cup, mounting the poultry on the horizontal arm of the device, preferably in a breast-down orientation, and roasting the poultry.

7 Claims, 10 Drawing Sheets

FLAVOR INFUSION DEVICE FOR ROASTING POULTRY

CROSS-REFERENCE TO RELATED APPLICATION

This application claims priority to pending U.S. Provisional Patent Application No. 61/244,469 filed Sep. 22, 2009, entitled "Flavor Infusion Device for Roasting Fowl" and is incorporated by reference herein in its entirety.

BACKGROUND OF THE INVENTION

1. Field of the Invention

The present invention relates generally to food preparation and, more particularly, to a flavor infusion device for roasting poultry or fowl such as chicken, turkey, duck and the like.

2. Background of the Invention

It is known to cook poultry such as chicken on a grill, where the open cavity of the chicken is placed over an opened beer can, this popular cooking method being known as "beer can chicken". During cooking, the beer evaporates into the cavity of the bird, lending additional flavoring and moisture to the cooked fowl. A device currently being sold for cooking chickens and turkeys is known as "The Turkey Cannon". The device comprises a hollow cylindrical tube which is mounted on its face to a rectangular metal frame support which is placed within a roasting pan where the metal support frame rests on the bottom wall of the pan. The hollow tube extends upwardly from the metal support frame at an angle of about 45° relative to horizontal. A flavoring liquid such as beer, wine, soda or the like is placed in the hollow cylinder and the open cavity of the bird is placed over the cylinder with the breast up. Cooking then progresses in a manner similar to the beer can method. Due to the approximate 45° angular mounting of the cylindrical tube relative to the horizontal support frame (and bottom of the roasting pan), there is a substantial height required in the oven or grill if a large turkey is mounted on the tube. Clean-up is also a problem because the support frame rests on the inside bottom wall of the roasting pan, submerged in the cooking juices.

The present invention solves these problems by providing a flavor infusion device for roasting poultry or fowl that is compact, low profile, and does not rest in the bottom of the roasting pan, making clean-up easy. The flavor infusion device of the present invention includes unique pan attachment means allowing for attachment of more than one device on a single roasting pan in the event more than one bird is to be cooked. The roaster device may be supplied in several lengths, for example, three lengths or sizes so as to accommodate poultry of various sizes. A largest size will accommodate a turkey, an intermediate size would handle a chicken, and a smaller size would be suitable for roasting a game bird, for example.

SUMMARY OF THE INVENTION

Briefly stated, the flavor infusion roaster device of the invention comprises a unitary piece of metal such as stainless steel having a first end carrying an offset fork arrangement for attachment to a sidewall edge of a roasting pan, an intermediate portion extending upwardly from the offset fork and curvingly bent at about a selected angle transitioning to approximately a horizontally extending arm portion. The horizontal arm portion carries a cup-shaped member. In use, the offset fork arrangement is slipped over the edge of the roasting pan and a desired liquid flavoring mixture is poured into the cup-shaped member of the horizontal arm. The poultry, such as a chicken, turkey, duck, game hen or the like, is then placed on the horizontal arm portion through the rear cavity of the fowl, preferably in a breast-down orientation. During roasting, the flavoring liquid in the cup-shaped member slowly evaporates and penetrates the inside of the fowl causing the juices generated during cooking to infuse into the meat. The breast-down orientation of the fowl further enhances the moisture/juice retention in the breast meat.

DETAILED DESCRIPTION OF THE INVENTION

The flavor infusion roasting device of the present invention is generally designated 2 and shown in drawing FIGS. 1-4 mounted on a sidewall 4 of a roasting pan 6. The device 2 is preferably made from a metal such as 304 stainless steel with a ½ hard temper for strength and resistance to deformation at oven roasting temperatures. The stainless steel is preferably between about 0.120-0.180 inch in thickness. In one embodiment, a removable flavor cup 8 is fitted within a cutout portion 8' shown in FIG. 5. Alternatively, the cup 8 may be fixed in place as by welding as disclosed hereinafter with respect to the further preferred embodiment depicted in FIGS. 6 to 8A-E.

Figure 5:
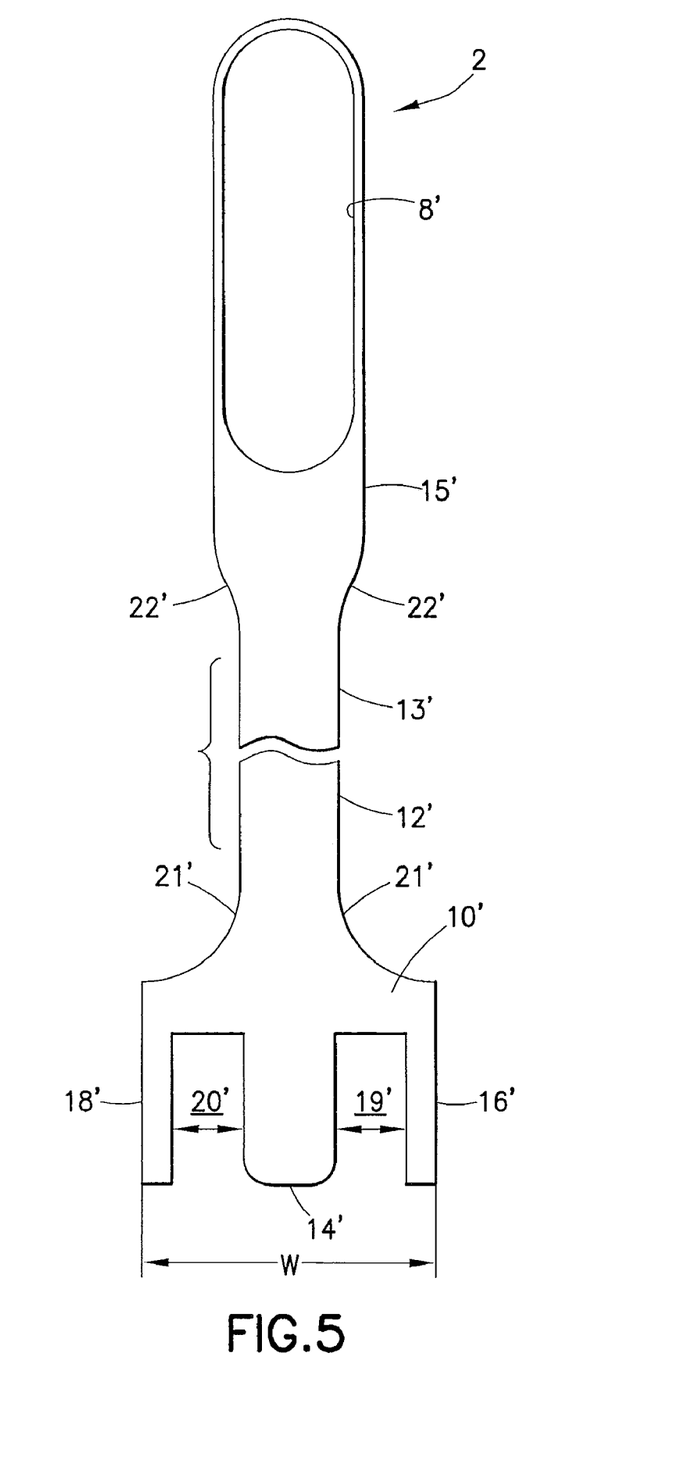
FIG. 5 is a plan view of a cutout blank of the device as cut from a metal sheet prior to bending to final shape of the device of the invention shown in FIGS. 1-4.

FIG. 5 depicts the blank 2' as it appears after it is cut out from a metal sheet, prior to forming/bending into the shape of the flavor infusion device 2. The blank 2' may be conveniently cut from a sheet of 304 stainless steel using a programmable laser device in a pattern depicted in FIG. 5.

In the blank 2', a fork-shaped mounting portion 10' has two outwardly disposed fingers 16' and 18' with a central tab 14' with cutout metal portions 19' and 20' therebetween. The blank 2' contains radiused portions 21' which taper inwardly from the outer edges of the fingers 16' and 18' to a smaller width of 1 inch at blank portion 12'. The dimensional width "W" of the mounting portion 10' may be on the order of 3 inches. The central tab 14' is about 1 inch in width while each of the fingers 16' and 18' are about 0.30 inch in width at a spacing of about 0.70 inch from the central tab 14'. The blank portion 12' is integral with portion 13' which then widens at radiused portion 22' to form a wider arm portion 15' to accommodate the cutout portion 8' for receiving the flavor cup 8 therein. The flavor cup 8 is preferably a deep drawn cup made from stainless steel having a peripheral flange 7 for engaging the edge of the wider portion 15 around the cutout portion 8'. The cup 8 also includes a downwardly depending drawn portion 9 for containing the flavoring liquid. The cup 8 may be removable, or may contain an indent portion (not shown) to permit a snap-in fit, or it may be permanently secured to the wider portion 15' as discussed hereinafter with respect to FIGS. 6-8.

The radiused portions 21' and 22' preferably are the same dimension so that side-by-side blanks may be laser cut from a sheet of stainless steel with minimum waste of stock.

Figure 1:
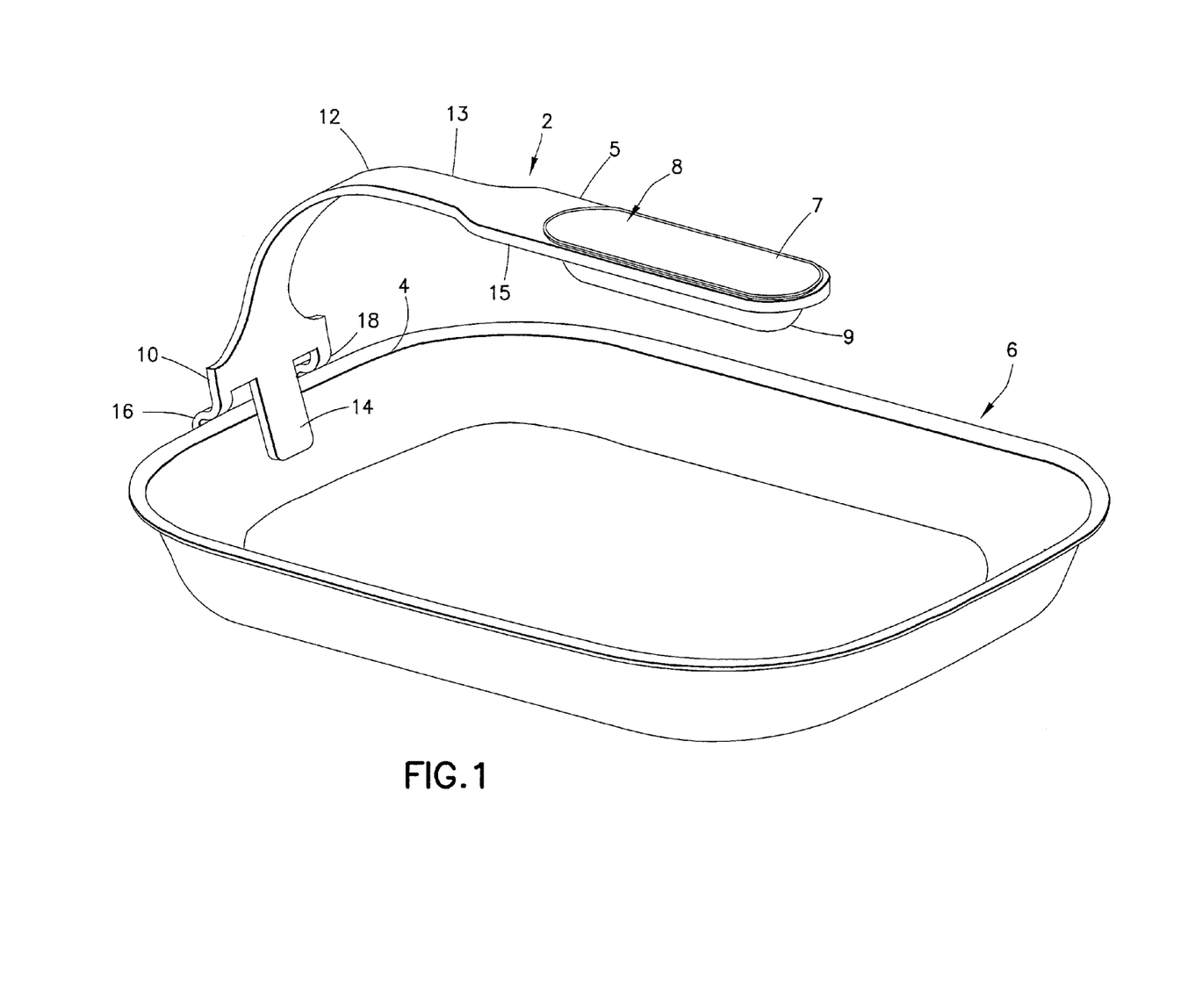
FIG. 1 is a perspective view of one presently preferred embodiment of the flavor infusion roasting device of the present invention mounted on a roasting pan.
Figure 2:
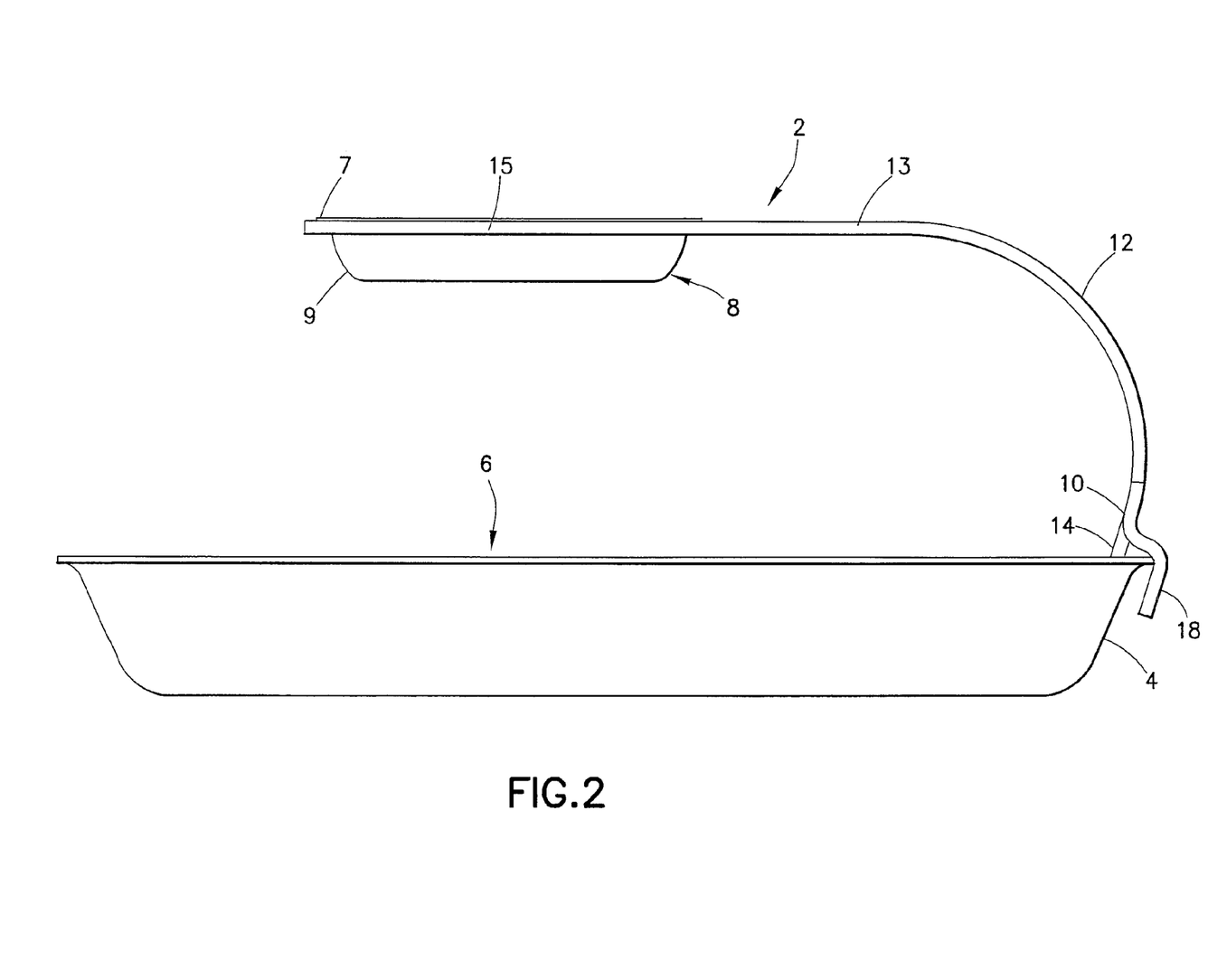
FIG. 2 is a side elevation view of the roasting device and pan of FIG. 1.
Figure 3:
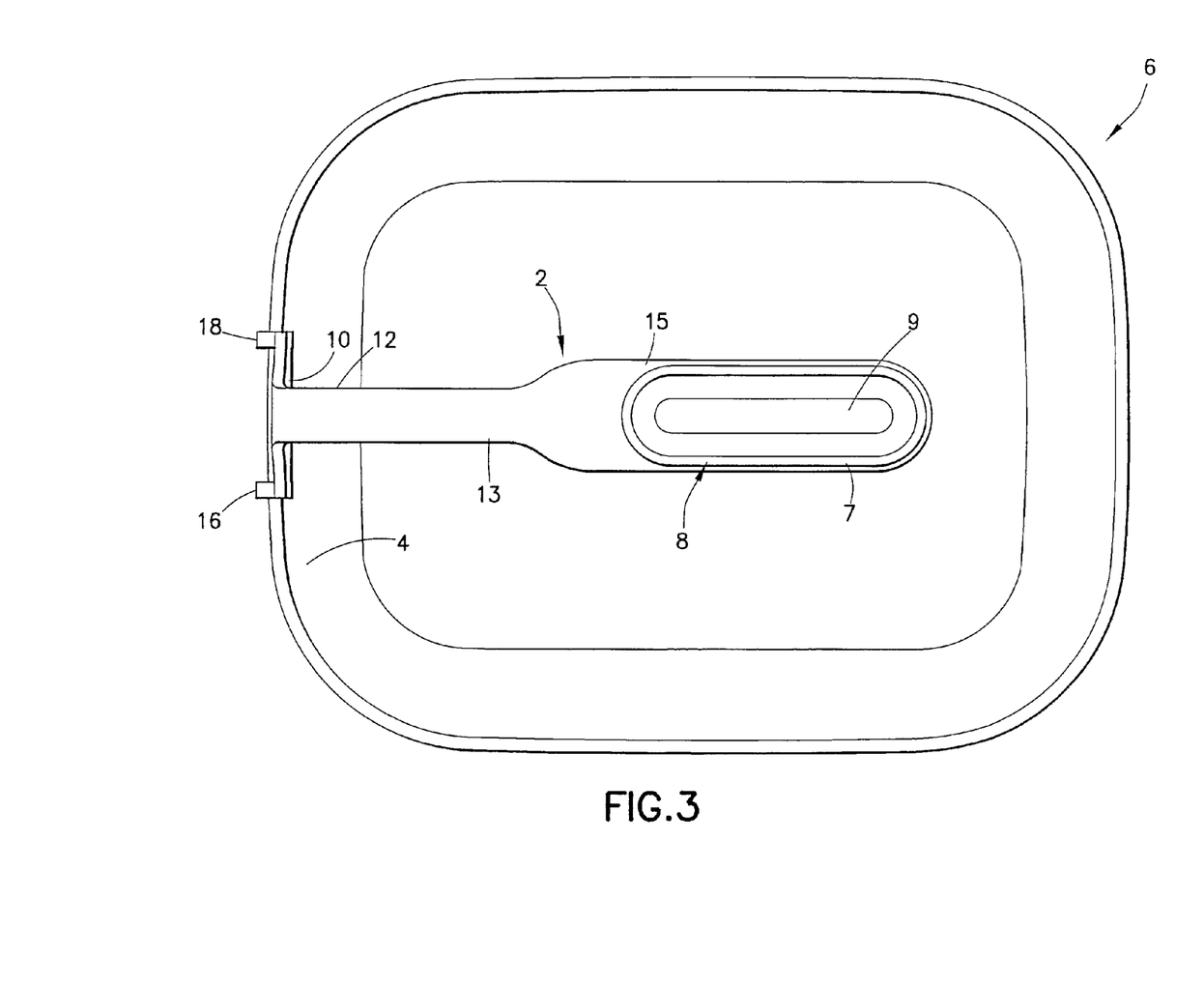
FIG. 3 is a top plan view of the roasting device and pan of FIGS. 1-2.
Figure 4:
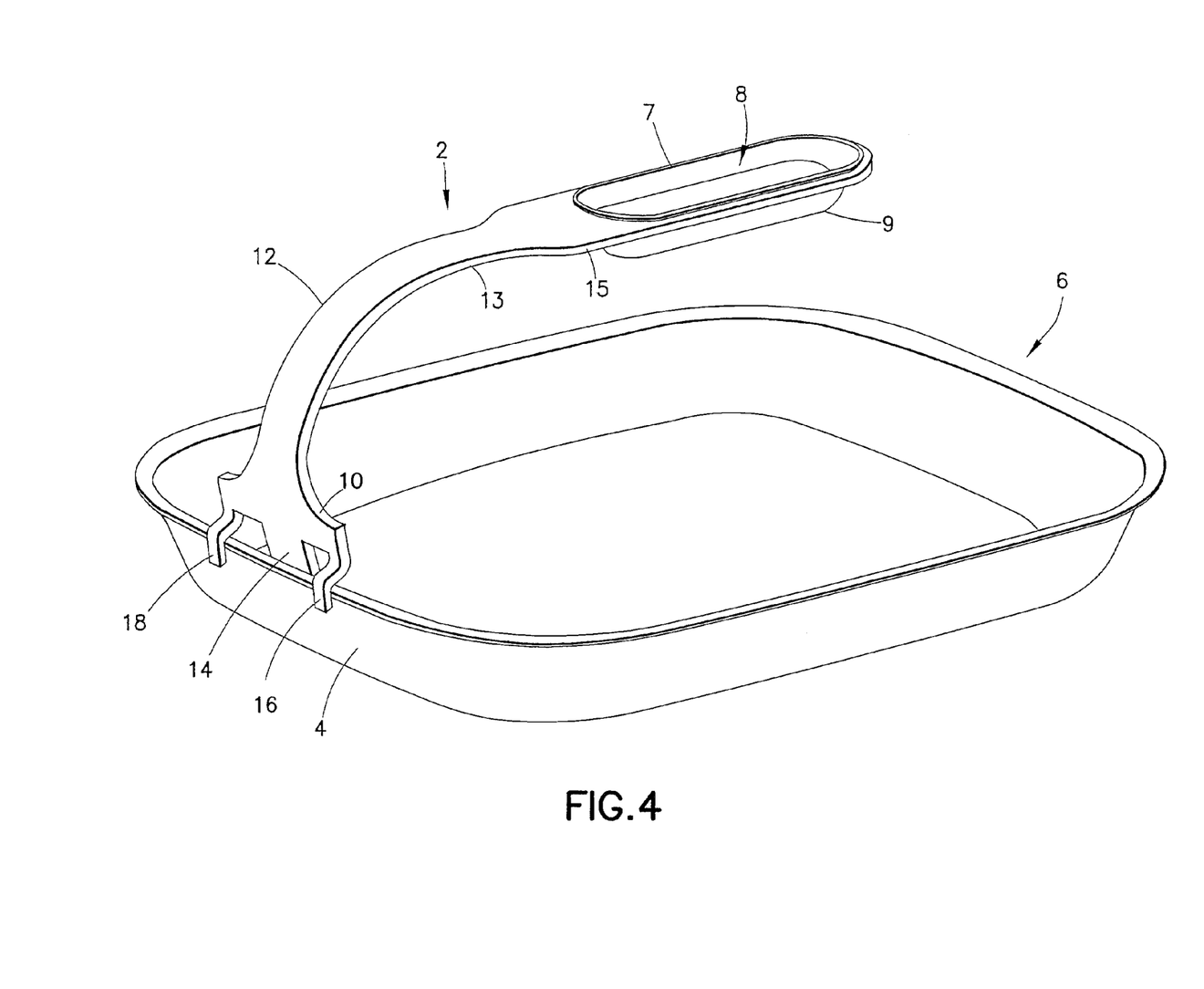
FIG. 4 is a rear perspective view of the roasting device and roasting pan similar to FIG. 1.

After the flat blank 2' is cut from the sheet of stainless steel, the fork-shaped mounting portion 10 is formed by bending the fingers 16 and 18 in a press so that the fingers are spaced rearwardly relative to the central tab 14 a distance of about 0.40 inch. In this configuration, the lower end of the central tab 14 engages the inside of the sidewall of the roasting pan 6 while the spaced-apart fingers 16 and 18 engage the rear edge of the sidewall 4 of the pan. The blank 2' is also subjected to a bending operation to form a radiused portion 12 as best seen in FIG. 2. The radiused portion 12 extends from the mounting portion 10 to the beam portion 13 and integral, wider beam portion 15 defining an arm portion such that the arm portion is substantially horizontal or slightly above horizontal relative to the bottom wall of the roasting pan 6. The "slightly above horizontal" orientation may be desirable if a heavier bird is to be roasted and is included in the definition of "substantially horizontal". Due to the temper or stiffness of the stainless steel, this substantially horizontal alignment will be substantially retained even after the poultry is mounted on the horizontal arm portion 15. The elevated cooking temperatures will not cause the stainless steel to soften and lose its temper.

Figure 6:
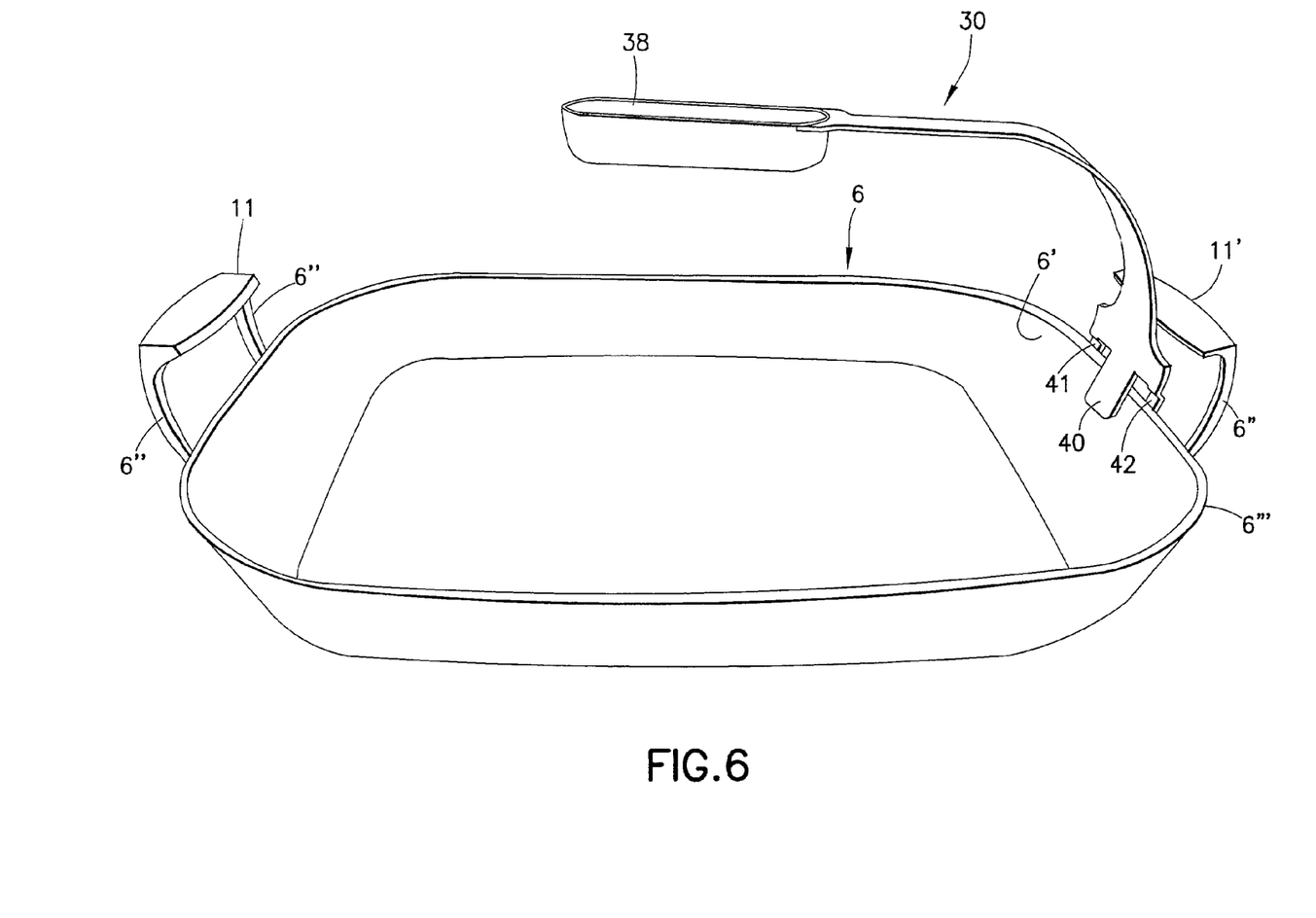
FIG. 6 is a side elevation view of another presently preferred embodiment of the flavor infusion roasting device of the present invention mounted on a roasting pan with handles affixed to the roasting pan.
Figure 7:
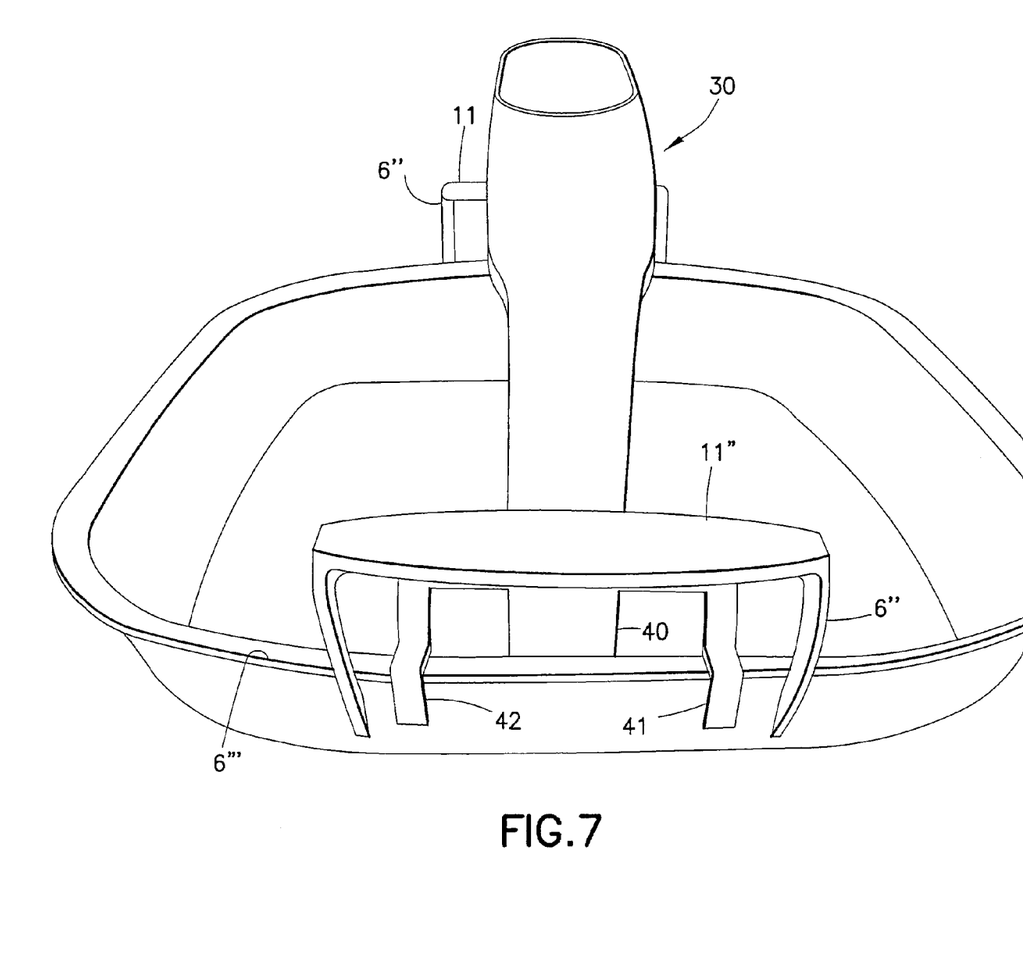
FIG. 7 is an end view of the embodiment of FIG. 6.

In use, the flavor infusion device 2 is mounted on the roasting pan 6 as shown in FIGS. 1-4 and 6-7 and an infusion liquid of choice such as beer, wine, soup broth, herbs or the like are placed in the flavor cup 8 or 38 (FIGS. 6-7). The open cavity of the chicken, turkey or other fowl to be roasted is placed around the horizontal arm portion 15 of the device 2 so that the flavor cup resides in the open cavity of the fowl. A preferred mode of cooking is with the breast of the poultry facing downward toward the roasting pan. In this breast-down orientation, the cooking juices infused from the flavor cup will flow downwardly by gravity and provide a very juicy breast after roasting.

The elongated or oblong shape of the flavor cup also provides a greater exposed surface area of flavoring liquid for infusion into the cooking fowl than would be the case with a circular cup, thus adding the flavor imparted. Also, since the flavor infusion device attaches to the sidewall 4 of the roasting pan 6, clean-up is much easier than otherwise would be the case, even when other foodstuffs such as potatoes, carrots and the like are placed in the bottom of the roasting pan for cooking along with the fowl.

The flavor infusion device can be made in several lengths to fit various size roasting pan and fowls. A large size would be ideal for a turkey in a large roasting pan, while a medium size would be suitable for a roasting chicken. A smaller size device would be useful for cooking smaller fowl or two of the smaller flavor infusion roasting devices could be employed on the longer sidewalls (one on each side) of the roasting pan.

Another presently preferred embodiment of the flavor infusion device is depicted in FIGS. 6-8 and identified generally by reference numeral 30. The flavor infusion device 30 is substantially identical with the device 2 described above and depicted in FIGS. 1-5, except that the flavor cup 38 is weldably secured to the horizontal arm portion 35. The blank shape 30' for forming the device 30 is depicted in FIG. 8E. The distal end of the arm portion 35 has an arc-shaped cutout 36 to which the separately formed flavor cup 38 is fitted and welded to make the cup 38 integral with the arm portion 35. The weld bead is ground and polished smooth to provide a visually pleasing appearance. The flavor cup 38 is preferably about 4 inches long, 1.5 inches wide, and 0.88 inch deep.

Figure 8A:
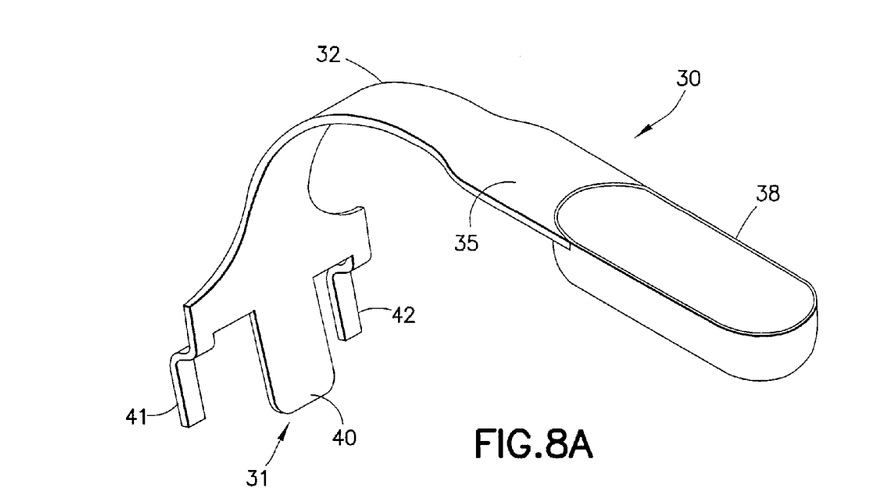
FIGS. 8A-8E are various views of the embodiment of FIGS. 6 and 7.
Figure 8B:
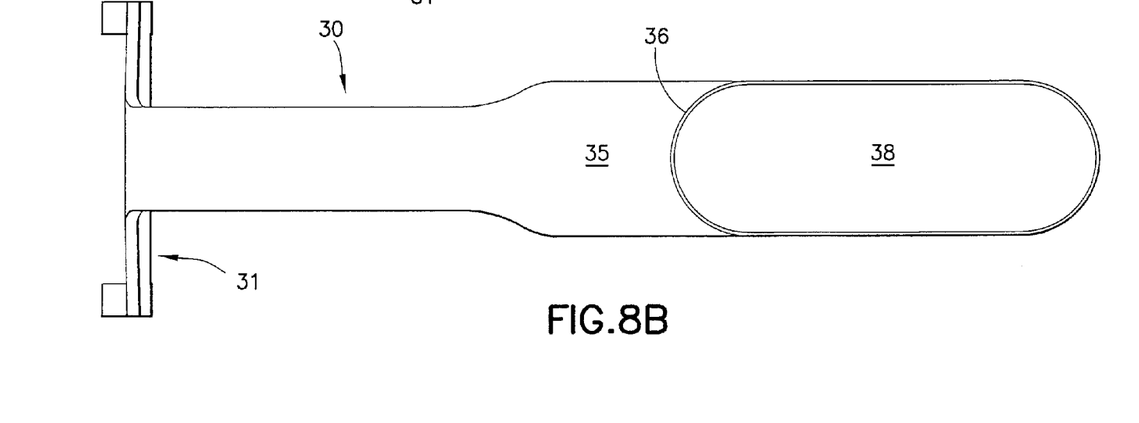
Figure 8C:
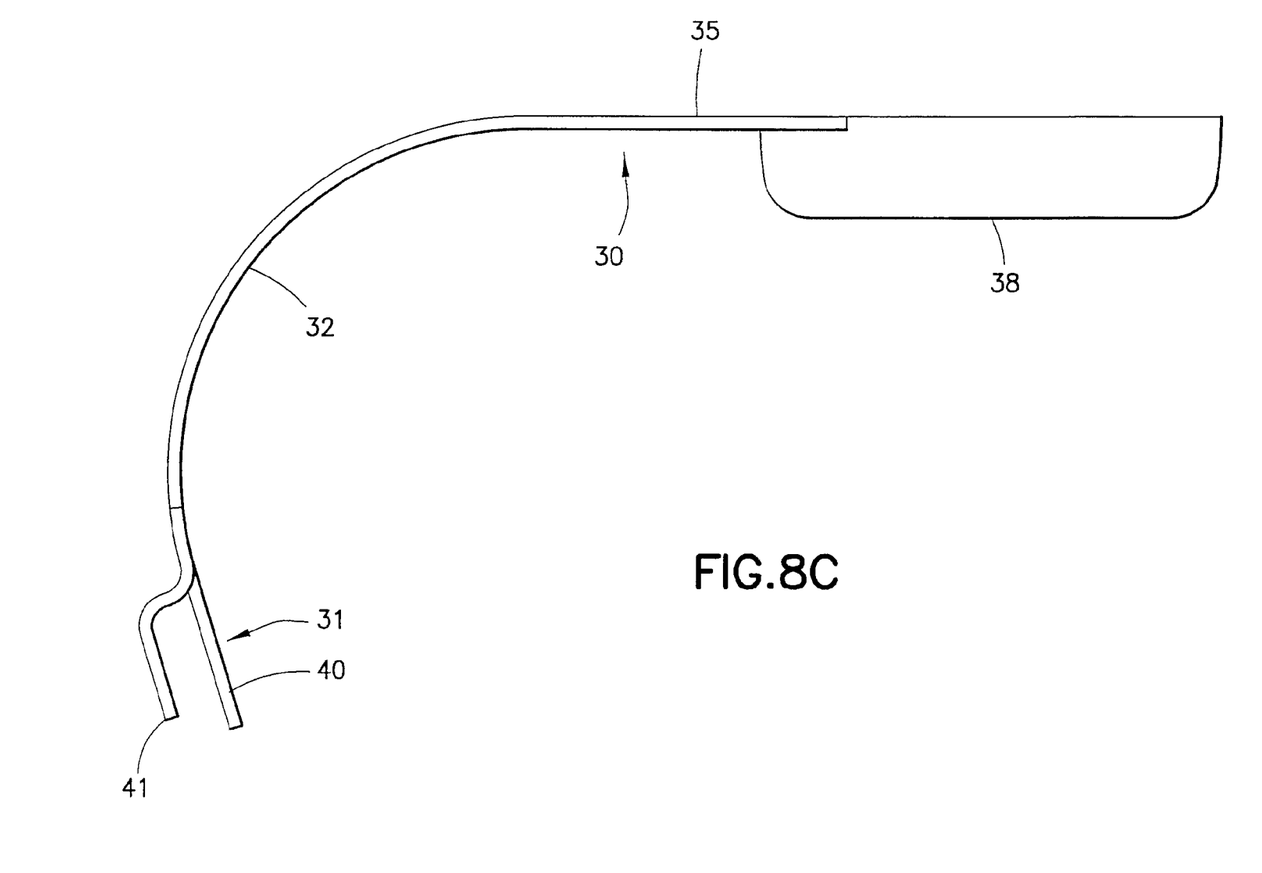
Figure 8D:
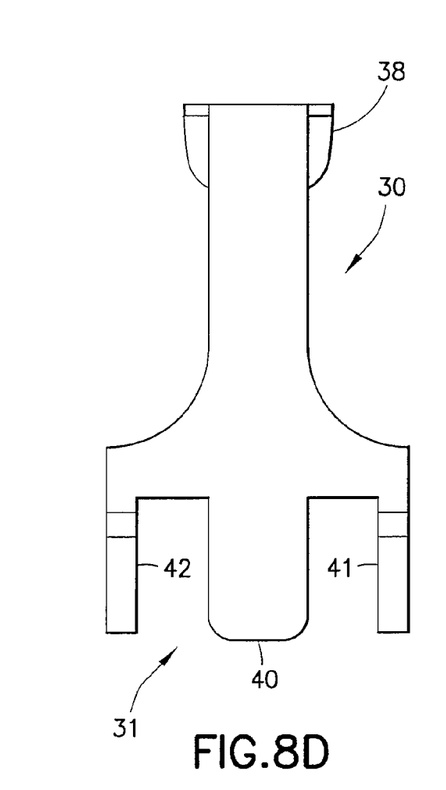
Figure 8E:
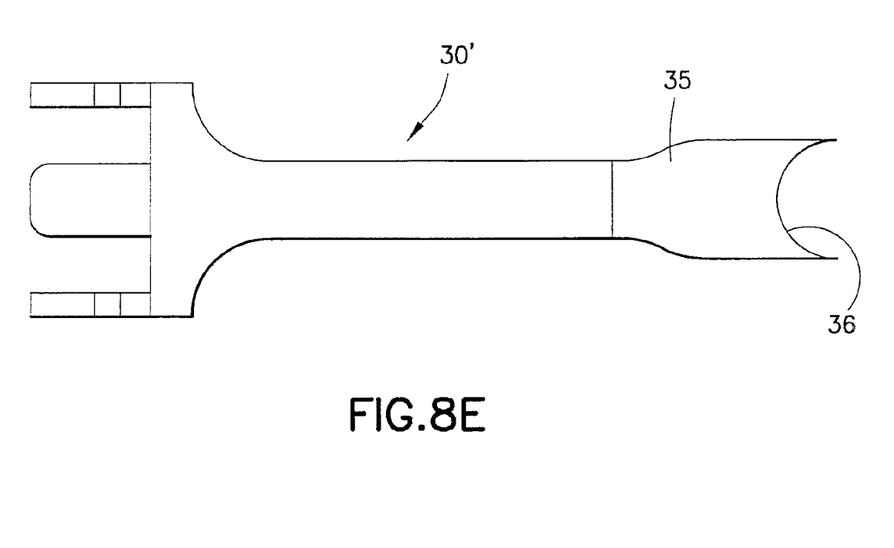

The forked attachment end 31 is essentially the same as that described with respect to the forked attachment end 10 previously described. The bent portion 32, as best seen in FIG. 8C, is formed at an angle of about 73° as measured between the central tab 40 of forked attachment end 31 and the substantially horizontal arm portion 35. An angle less than 90° for the bent portion 32 is necessary to accommodate the sloped sidewall 6' of the roasting pan 6 as shown in FIG. 6, for example. The sidewall 6' of the roasting pan is sloped at an angle of about 17°. When the device 30 is fitted onto the sloped pan sidewall 6' of 17°, the bent portion 32 having a 73° angularity will provide a substantially horizontal relationship between the arm portion 35 and the bottom wall of the pan 6.

It will also be seen in FIG. 7 that the pan 6 is fitted with conventional lifting handles 11". The forked attachment end 31 is dimensioned such that the outer fingers 41 and 42 fit between the vertical members 6" of the handle 11 as seen in FIG. 7.

The fingers 41 and 42 are bent outwardly in an offset manner and are generally parallel to the central tab 40. A spacing or offset between the flat surfaces of the fingers 41 and 42 and the flat surface of the central tab 40 as shown in FIG. 8C is about 0.4 inch, which is sufficient to permit the fingers 41 and 42 and central tab 40 of the attachment end 31 to fit over the edge 6''' of the pan 6 such that the lower end of the central tab 40 contacts sidewall 6' of the pan while the upper portions of the fingers contact the top edge 6''' of the pan.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A flavor infusion device for roasting poultry comprising an elongated metal member having an attachment means at one end for attachment to a sidewall of a roasting pan, a radiused bent portion extending upwardly from the attachment means, and an arm portion extending from the radiused bent portion in a substantially horizontal orientation relative to the roasting pan to support an open cavity of the poultry, said horizontal arm portion having a cup associated therewith for receiving an infusion flavoring liquid therein.

2. The device of claim 1 wherein the elongated metal member is 304 stainless steel having a ½ hard temper.

3. The device of claim 1 wherein the flavor cup is removably supported in the arm portion.

4. The device of claim 1 wherein the flavor cup is permanently affixed to the horizontal arm portion.

5. A method of roasting poultry, comprising the steps of:
 (a) providing the flavor infusion device of claim 1;
 (b) attaching the device to a sidewall of a roasting pan;
 (c) placing an infusion liquid in the cup;
 (d) mounting the poultry on the arm of the device; and
 (e) roasting the poultry.

6. The method of claim 5 wherein the poultry is chicken.

7. The method of claim 6 wherein the chicken is mounted on the arm of the device in a breast-down orientation.

* * * * *